United States Patent [19]
O'Brien

[11] Patent Number: 5,788,949
[45] Date of Patent: Aug. 4, 1998

[54] LIQUID PHASE CONVERSION OF A SOURCE OF SULFUR DIOXIDE TO SULFURIC ACID

[75] Inventor: Robert N. O'Brien, Victoria, Canada

[73] Assignee: R. And O. Ore Processing Ltd., Vancouver, Canada

[21] Appl. No.: 673,175

[22] Filed: Jun. 26, 1996

Related U.S. Application Data

[63] Continuation-in-part of Ser. No. 410,957, Mar. 27, 1995, abandoned.

[51] Int. Cl.$^6$ .......................... C01B 17/69; C01B 17/82
[52] U.S. Cl. ........................... 423/523; 423/243.03
[58] Field of Search ........................ 423/523, 524, 423/525, 526, 243.03

[56] References Cited

U.S. PATENT DOCUMENTS

| | | | |
|---|---|---|---|
| 1,810,253 | 6/1931 | Petersen | 423/524 |
| 2,125,143 | 7/1938 | Ziesberg | 423/524 |
| 2,562,240 | 7/1951 | Merriam et al. | 423/521 |
| 3,042,489 | 7/1962 | Schoeffel | 423/521 |
| 4,011,298 | 3/1977 | Fukui et al. | 423/235 |

FOREIGN PATENT DOCUMENTS

| | | | |
|---|---|---|---|
| 279003 | 8/1988 | European Pat. Off. | |
| 40 19 184 | 1/1991 | Germany | |
| 52-29469 | 3/1977 | Japan | |
| 1699900 | 12/1991 | U.S.S.R. | 423/524 |
| 503643 | 4/1939 | United Kingdom | 423/524 |
| 736146 | 9/1955 | United Kingdom | 423/524 |
| 1 513 516 | 6/1978 | United Kingdom | |

OTHER PUBLICATIONS

Babor, Joseph A. Basic College Chemistry, 2nd Edition 1953, Thomas Y Crowell Co. NY NY pp. 265–266.
Perry, John H. Editor, Chemical Engineers Handbook Third Edition, 1950 McGraw Hill Book Co. NY NY pp. 597–602, 702, 707–710.

*Primary Examiner*—Gary P. Straub
*Attorney, Agent, or Firm*—Bell Seltzer Intellectual Property Law Group of Alston & Bird LLP

[57] ABSTRACT

A process for producing in liquid phase, concentrated sulfuric acid in the liquid phase from a source of sulfur dioxide, is described. The process comprises, converting the source of sulfur dioxide to sulfuric acid. The liquid phase, comprises:

a) nitric acid at a sufficient concentration to commence conversion in the presence of oxygen, of sulfur dioxide into sulfuric acid in the initial absence of sulfuric acid, b) nitric acid at a sufficient concentration to maintain conversion of sulfur dioxide in the presence of sulfuric acid either generated by said conversion or present at commencement of said conversion, and c) combined concentration of nitric acid and sulfuric acid ranging from 5M to 16M where the concentration of nitric acid is at least 5M in the initial absence of sulfuric acid, and a source of oxygen is introduced to the aqueous phase at a concentration sufficient to provide for such catalytic conversion of $SO_2$ to $H_2SO_4$.

22 Claims, 1 Drawing Sheet

LIQUID PHASE CONVERSION OF A SOURCE OF SULFUR DIOXIDE TO SULFURIC ACID

This application is a Continuation-In-Part application of U.S. patent application Ser. No. 08/410,957 filed on Mar. 27, 1995, now abandoned.

FIELD OF THE INVENTION

This invention relates to a process for producing sulfuric acid in the liquid phase from a source of sulfur dioxide.

BACKGROUND OF THE INVENTION

Concentrated sulfuric acid is a major chemical commodity used in a variety of industries, ranging from heavy industry through to fine chemical manufacture. Sulfuric acid is primarily made by two distinct commercial processes. They are commonly referred to as the lead chamber process and the Contact Process. The more advanced of the two processes is the Contact Process. There have been several advances in the Contact Process technology, such as described in U.S. Pat. No. 5,118,490, where a process is capable of treating wet sulfur dioxide gases which are catalytically converted to sulfur trioxide gases. In the presence of water, the generated $SO_3$ produces sulfuric acid. One source for the wet sulfur dioxide gas is the combustion of hydrogen sulphide.

Hydrogen sulphide and other possibly harmful and/or valuable components, including various $SO_x$ containing gases, can be produced by metal smelting, hydrometallurgical treatments of ores, ore roasting in ovens, coke ovens, thermal-electric generating stations, cracking of crude oils, pulp and paper production and steel manufacturing, to name only a few. It is important that at least $H_2S$ be removed from the gas stream before exhaust to atmosphere. Various techniques have been developed to deal with the presence of $H_2S$ in a gas stream. For example, U.K. Patent 1,376,830, discloses the removal of hydrogen sulphide from coke oven gas by way of a water scrubbing technique, where the water includes ammonium salts, iron sulphate, alkaline arsenite, alkaline arsenate or soda, as well as catalytic materials for converting the hydrogen sulphide to elemental sulfur. Such technique however, develops complexes with the hydrogen sulphide, which in turn must be disposed off. Similarly, disposal presents a problem with the catalytic conversion technique of U.S. Pat. No. 5,118,490, where it is difficult to dispose of the vanadium and/or platinum catalyst.

Another example in the conversion of a source of hydrogen sulphide into sulfur is described in applicant's own published international application WO94/07796. That process describes the conversion of hydrogen sulphide into sulfur by way of a reaction in the liquid phase, which comprises both sulfuric and nitric acids.

Other desulfurizing techniques include that described in U.S. Pat. No. 4,714,598. Hydrogen sulphide is reacted with cerium oxide, to form cerium oxygen sulfur compounds. The cerium oxides are capable of being regenerated for reuse in the conversion of hydrogen sulphide.

Canadian patent 1,103,412, describes the recovery of hydrogen sulphide off gases, generated during the pulp bleaching process. It is generally stated that the hydrogen sulphide off gases, are oxidised to produce $SO_3$, which is dissolved in a water solution to yield a sulfuric acid product. The generated sulfuric acid is then returned to the manufacturing process to make chlorine dioxide, which in turn, is used in the pulp bleaching process.

The preferred process for preparing sulfuric acid is the contact process, where $SO_2$ is oxidised to $SO_3$ in the gas phase, and the $SO_3$ then with water makes $H_2SO_4$. Other processes to be considered are somewhat unconventional, for example, U.S. Pat. No. 2,342,704, describes the manufacture of an aqueous solution of sulfuric acid from sulfur dioxide, by passing through a gas absorbing zone, a stream of an aqueous absorbent solution containing manganese sulphate and a material selected from the group consisting of alkyl naphthalene sulphonic acids and the alkaline metal salts thereof. Both components are in relatively small amounts and in a concentration required for the maximum rate of conversion for the concentration of the aqueous solution of sulfuric acid being produced. The process is accomplished by passing a stream of gas containing sulfur dioxide and oxygen in intimate contact with and countercurrent to the stream of aqueous absorbent solution in the zone and by withdrawing from the zone an aqueous solution of sulfuric acid containing up to approximately 40% by weight of sulfuric acid. Such low percentage by weight of sulfuric acid is not that useful and would normally not be valuable for reuse in most of the major industrial applications.

U.S. Pat. No. 3,042,489, describes a non-catalytic process for the production of sulfuric acid in high yield by oxidising sulfur in an aqueous dispersion to sulfur trioxide at a temperature between about 275° C. and 360° C. The reaction is carried out in a pressure vessel under a pressure sufficient to maintain some of the water in the liquid phase and recovering sulfuric acid from the oxidised product. The construction operation and maintenance of such a pressure vessel is expensive and would render the selling price of the product more expensive.

U.S. Pat. No. 1,810,253 describes what the inventor (Petersen) believes is an improvement to the lead chamber process. The improved process makes sulfuric acid at a concentration of about 60% by wt. or 12M. Although the patent describes higher concentrations, people skilled in the art knew that the thermodynamics and kinetics of the lead chamber process were incapable of making a higher concentration of sulfuric acid. Petersen's process is carried out in the gas phase, that is a gaseous phase of $SO_2$ is contacted with a thin film liquid phase containing sulfuric and nitric acid to convert $SO_2$ into $H_2SO_4$ at the interface of the thin film liquid and the large volume gaseous phase passing through the packed tower. Petersen's contribution to the lead chamber process was to increase the surface area of the walls in the lead chamber process by providing very small tower packing. The increased surface area of the thin film liquid thereby increased the interface with the gaseous phase to increase conversion of $SO_2$ into $H_2SO_4$.

It is important that any sulfuric acid manufacturing process, produce concentrated sulfuric acid, typically having a concentration of $H_2SO_4$, greater than 80% and preferably in the range of 90% to 98%. Furthermore, a preferred process is capable of processing $H_2S$ concentrations from a ppm amount up to 40% by weight in a gas stream. This has been very difficult for Prior Art processes to accomplish. However, in accordance with this invention, a process is now provided which converts in the liquid phase, a source of sulfur dioxide into sulfuric acid. The process is capable of converting dilute to fairly concentrated sources of sulfur dioxide which may be generated by smelting processes or by the combustion of $H_2S$ or mercaptans to form sulfur dioxide plus various inerts. A further advantage and feature of this invention is that the production of the sulfuric acid from a source of sulfur dioxide, does not produce any sulfur during

3 the manufacturing process. Hence, there is no solid sulfur to contend with in any of the processing equipment.

SUMMARY OF THE INVENTION

According to an aspect of the invention, a process is provided for producing in a liquid phase, concentrated sulfuric acid from a source of sulfur dioxide. The process comprises:

i) bubbling into said continuous liquid phase a gaseous source of sulfur dioxide and a gaseous source of oxygen;

ii) converting in the continuous liquid phase said gaseous source of sulfur dioxide to sulfuric acid, the continuous liquid phase comprising:
nitric acid and sulfuric acid at a sufficient concentration to develop nitrate ions in the continuous liquid phase which oxidize in the continuous liquid phase sulfur dioxide at bubble surface to sulfuric acid and thereby produce nitrosyl ions where the combined concentration of nitric acid and sulfuric acid ranges from 5M to 16M with the proviso that the minimum concentration of nitric acid is 0.1M;

iii) said gaseous source of oxygen being bubbled into said continuous liquid phase in a stoichiometric excess to support the catalytic conversion in the continuous liquid phase of $SO_2$ into $H_2SO_4$ which includes regenerating in the continuous liquid phase nitrate ions by oxidizing in the liquid phase the nitrosyl ions at oxygen bubble surface to produce in the liquid phase the necessary nitrate ions to continue oxidation of said sulfur dioxide;

iv) maintaining said liquid phase at a temperature in the range of 20° C. to 150° C.

According to a preferred aspect of the invention, when the source of sulfur dioxide is from burning $H_2S$ liquid or solid sulfur or sulfur containing organics, preferably the heat of combustion is used to concentrate, if needed, the resultant liquid phase containing sulfuric acid, to produce highly concentrated sulfuric acid in the range of 90% and greater.

BRIEF DESCRIPTION OF THE DRAWINGS

Preferred aspects of the invention are described with respect to FIG. 1, which is a schematic showing the general layout of the components in which the process of this invention is carried out to produce a concentrated form of sulfuric acid.

DETAILED DESCRIPTION OF PREFERRED EMBODIMENTS OF THE INVENTION

Figure 1:
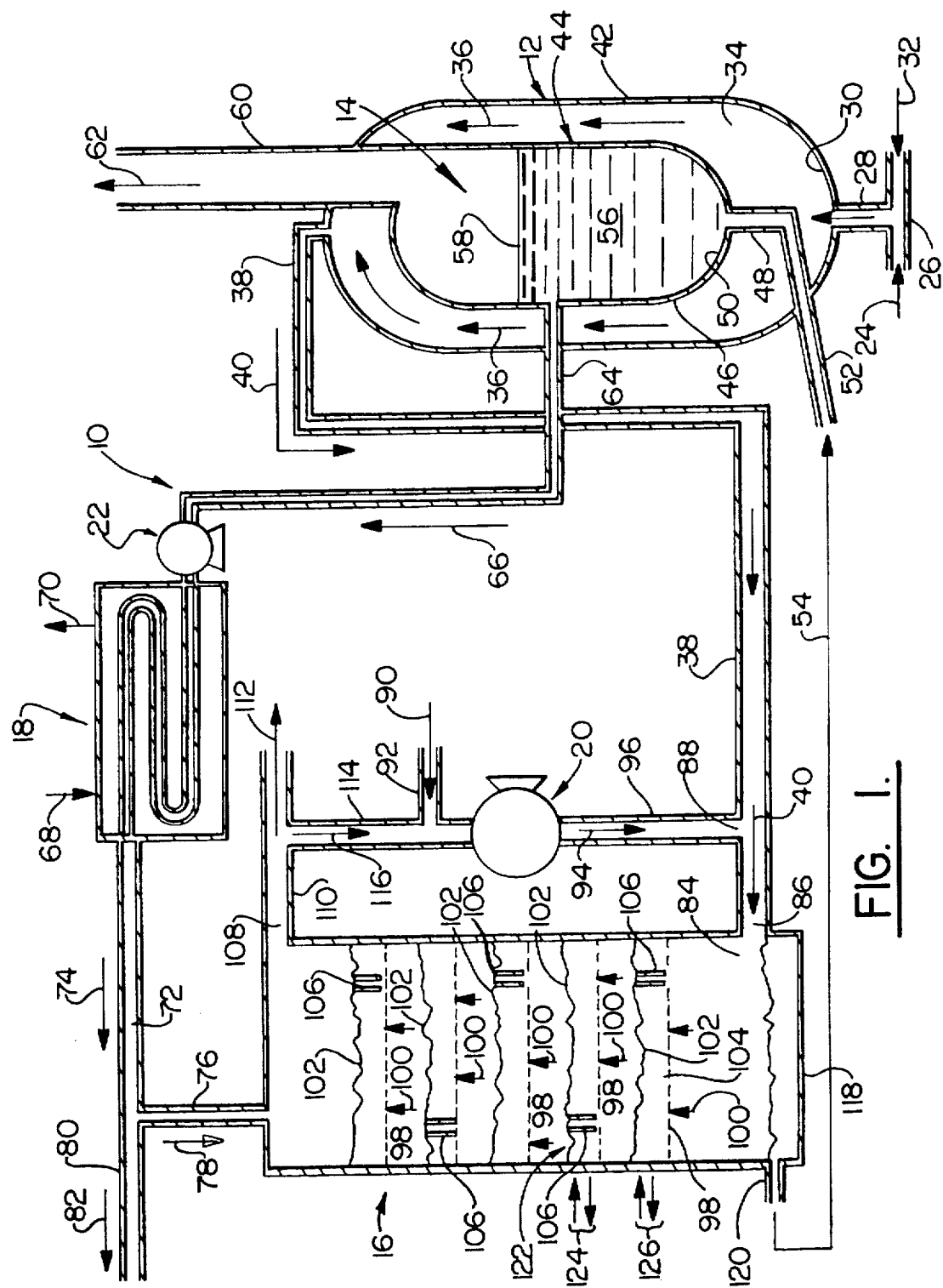

The process in accordance with this invention has the facility to recover sources of sulfur dioxide or entities which can be converted to sulfur dioxide. The term source of sulfur dioxide is intended to include any solid, liquid or gaseous form which contains or is convertible into a gaseous stream containing sulfur dioxide. This terminology is therefore intended to include sources such as simple gaseous, solid or liquid compounds containing sulfur because burning of such compounds produces sulfur dioxide. The components are recovered from gaseous streams and the recovery is conducted in a liquid phase with conversion of the sulfur dioxide to a valuable product namely sulfuric acid. The process is able to treat gas streams having from dilute to concentrated levels of sulfur dioxide due to the fact that the conversion is carried out in the liquid phase. Other sources of sulfur dioxide include the burning of sulfur and sulfur

4 containing organics, such as, the roasting or burning of sulfide minerals which include FeS, $CuFeS_2$, CuS, $Cu_2S$ and the like. The sulfur may be in the form of a liquid stream or a flow of solids. Sulfur containing organics include mercaptans, polysulfides and sulfur containing amines.

$H_2S$ is particularly preferred as a component to be treated in accordance with the process of this invention, because prior processes which related to the conversion of $H_2S$ to less harmful components usually resulted in the production of sulfur which is unwanted for purposes of producing sulfuric acid. In accordance with this process, by burning the $H_2S$ to produce $SO_2$ and by virtue of the liquid phase conversion, sulfuric acid can be produced at a concentration which provides for valuable reuse. Furthermore, by carrying out the process in the liquid phase, without the requirement of metal catalyst such as $V_2O_5$ or platinum, as is used in the prior art contact process, there is little, if any, discard of harmful components. This is unlike the catalytically oxidised processes of the Prior Art, where discard of the vanadium and platinum catalysts is very costly and detrimental to the environment and the tail gas furnace as required by those prior art processes discharge some $SO_2$ to the atmosphere. On the other hand, the soluble, homogeneous liquid phase catalyst derived from the mixed acid can be reused totally. Also, burning $H_2S$ before introduction to the liquid phase of this invention, avoids feeding to the conversion system an explosive mixture of $H_2S$ in air. Instead, the $H_2S$ is burned in a controlled manner to avoid explosions and in turn to produce the desired source of sulfur dioxide. As the concentration of $H_2S$ in the incoming stream decreases, and hence the $SO_2$ to the liquid phase also decreases, it is understood that oxygen or an oxygen enriched air may be needed in the liquid phase of the process to effect proper conversion of the $SO_2$ in the production of the sulfuric acid.

The several advantages and features of this invention are achieved in the liquid phase catalytic conversion of an incoming source of $SO_2$ into sulfuric acid in the liquid phase. The process in accordance with a preferred embodiment of this invention, ensures the conversion of $H_2S$ into $H_2SO_4$ without the formation of elemental sulfur. There is no difficulty with an explosive gas mixture entering the tower, particularly in the case of treating $H_2S$. Considerably less heat is generated within the mass transfer tower compared to other processes, while the majority of the heat in the instance of burning $H_2S$ is generated in the incinerator. This allows the system to operate at a considerably lower temperature and where it is desirable to burn the $H_2S$, a significant advantage is provided in that the heat available from such incineration can be used to further concentrate the sulfuric acid generated in the liquid phase. Furthermore, a system of this nature costs considerably less than the cost for providing a physical plant for the high temperature and usually high pressure contact process or the lead chamber process. The physical plant of this invention only requires a hydrogen sulfide, sulfur containing organic or sulfur incinerating furnace with a sulfuric acid concentrator, normally in the form of a boiler, and one or more reactors preferably in the form of mass transfer towers, for the conversion of $SO_2$ to $H_2SO_4$. The maximum number of trays in the tower may vary greatly but it is possible to have up to 25 trays or the mass transfer exchange equivalent thereof. Furthermore, when it comes to the treatment of $H_2S$, the process of this invention avoids the formation of any elemental sulfur, so that in designing the conversion towers, there is no consideration required in the handling of generated solids.

Considerable experimental work has demonstrated that the conversion of $SO_2$ in the liquid phase into sulfuric acid, proceeds unexpectedly well without any unforseen problems in scaling up of the process. The liquid phase as developed in the reactor, has a sufficient concentration of nitric acid to commence conversion, in the presence of oxygen, of sulfur dioxide into sulfuric acid. In accordance with standard chemical processing techniques, an excess of oxygen is provided in the liquid phase to ensure conversion of substantially all, if not complete conversion of the incoming source of sulfur dioxide. Hence, assuming acceptable efficiencies for other aspects of the process, excess oxygen normally ensures a complete conversion of incoming sulfur dioxide.

The reactor which may be in the form of a tower having a plurality of trays can operate at close to atmospheric conditions. There is no requirement for an expensive pressure vessel or tower. The introduction of combined or separate gas streams of $SO_2$ and oxygen into the tower so that the gases bubble upwardly through the liquid on the trays can be at close to atmospheric pressure. There is no need to pressurize the gases to a high level such as with prior art processes which may require the gases to be at pressures in excess of two atmospheres. This is a significant cost saving because operating at more than two atmospheres, the cost is at least twice that compared to the modest operating pressures and temperatures of this invention. The difference in cost and maintenance of an essentially ambient pressure vessel is less costly by at least half in capital cost and also in maintenance compared to low-pressure vessels because of costly sealing devices, gaskets and expensive piping, pumps and pressure fittings. The tower of this invention can operate at minimum pressures of approximately ¼ of an atmosphere and perhaps at a maximum of no more than ½ of an atmosphere.

In the event that there is an initial absence of sulfuric acid, the nitric acid is also at a sufficient concentration to maintain conversion of sulfur dioxide. In the presence of sulfuric acid, either generated by the conversion or present at commencement of the conversion, the combined concentration of nitric acid and sulfuric acid ranges from about 5M to 16M, where the concentration of nitric acid is at least about 5M in the initial absence of sulfuric acid. When circumstances require, the concentration of nitric acid and sulfuric acid in the liquid phase may be about 5M and greater. Furthermore, the minimum concentration of nitric acid may be 5M and greater in the initial absence of sulfuric acid in the system. Depending upon the type of reactor system, it is understood that there can be a considerable variance in the relative concentrations of nitric acid and sulfuric acid. For example, in a stirred continuous reactor, the concentrations of nitric acid and sulfuric acid will be at the optimum concentrations, which are in the range of 10 to 16M for sulfuric acid and 0.1 to 5M for nitric acid. The relative concentration may vary due to continuous generation of sulfuric acid. The increasing sulfuric acid concentration is depleted or reduced by virtue of removing from the stirred reactor, a portion of the liquid phase.

In the event that the conversion is carried out in a tower with countercurrent flow of gases and liquids, it is appreciated that at the top of the tower, there will be the lowest concentration of sulfuric acid, or perhaps the sulfuric acid may be totally absent. Conversely, at the bottom of the tower, the concentration of sulfuric acid will be its highest. The concentration of nitric acid from the top of the tower to the bottom of the tower may vary where at the top of the tower, there is sufficient concentration of nitric acid to effect the conversion of sulfur dioxide, in the presence of oxygen, to sulfuric acid and correspondingly sufficient concentration of nitric acid at the bottom of the tower to maintain such conversion, where there is a higher concentration of sulfuric acid.

An alternative reactor set up may be a plug flow reactor, where there is a co-current flow of the gaseous and liquid phases. At the entrance to the plug flow reactor, the nitric acid is at a sufficient concentration to initiate the conversion in the absence of any sulfuric acid. As the liquid and gas phases progress through the plug flow reactor, the sulfuric acid concentration constantly increases till at the exit of the plug flow reactor, the concentration of sulfuric acid is at a maximum, for example, 16M where throughout the plug flow reactor the concentration of nitric acid has remained at a level to not only initiate conversion, but maintain conversion in the presence of sulfuric acid.

In all of these reactor set ups, the incoming stream of sulfur dioxide is introduced to the liquid phase in the presence of oxygen. Although the experimental work demonstrates clearly that the conversion takes place in the liquid phase, it is difficult to provide a stoichiometric analysis of the intermediate steps in the liquid phase conversion, other than to state generally that the stoichiometric conversion may overall be represented by the equation:

$$SO_2 + \tfrac{1}{2}O_2 + H_2O \rightarrow H_2SO_4$$

It is thought that the nitric acid is reduced to $HNO_2$ (nitrous acid) in the overall conversion of $SO_2$ into $H_2SO_4$ where the nitrous acid plays a very important role in enhancing the conversion of $SO_2$ into $H_2SO_4$. It is thought that the nitric acid in being reduced to $HNO_2$ may well act as or produce a catalyst at these concentration ranges to facilitate the conversion. In the presence of sufficient nitric acid, the conversion can take place at a liquid phase temperature ranging from 20° C. up to 150° C. Excellent conversion results have been achieved at $HNO_3$ concentrations less than 3M and at a temperature of less than 50° C., preferably 30° C. to 45° C. in the presence of at least 5M sulfuric acid. The nature of the catalytic component provided by the reduced version of $HNO_3$, is not fully understood. It is, however, proposed that the produced nitrous acid forms a nitrosyl ion ($NO^+$). The reaction is believed to be represented by $$HNO_2 + H^+ \rightarrow NO^+ + H_2O$$

where any strong acid will push the equilibrium of the reaction to the right. The nitrous acid is formed during the conversion of $SO_2$ into $H_2SO_4$ (liquid phase) as represented by:

$$SO_2 + HNO_3 + H_2O \rightarrow H_2SO_4 + HNO_2$$

where the $SO_2$ reduces $HNO_3$ to $HNO_2$. Hence the liquid phase catalyst $NO^+$ is formed in situ during the conversion of $SO_2$. The $NO^+$ immediately reacts with $O_2$, to form nitric acid as represented by:

$$2NO^+ + O_2 + 2H_2O \rightarrow 2HNO_3 + 2H^+.$$

This cyclic form of catalysis is known as homogeneous catalysis because of the cyclical reduction of $HNO_3$ to $HNO_2$ which makes the $NO^+$ which is then oxidised back to $HNO_3$.

In accordance with this invention, carrying out the conversion in the liquid phase provides for the build up in the liquid phase of sufficient liquid phase catalyst to achieve a vigourous conversion of $SO_2$ into $H_2SO_4$. Such build up of catalyst cannot be achieved in the thin film liquid of the prior art gaseous phase reaction. Oxygen must be present in the liquid phase to facilitate the conversion of $SO_2$ to $H_2SO_4$, where it is thought that oxygen plays an important role in the conversion of developed $NO^-$ entities back to nitric acid. It has been found that very little nitric acid has to be added back into the system because of this homogeneous catalytic system which can only happen in this liquid phase reaction and not in the prior art gaseous phase reactions. The desired concentration of nitric acid is between 0.5 and 5M. However, since the nitric acid functions overall as a homogeneous catalyst, we have found that the concentration of nitric acid in the liquid phase during normal operating conditions may range from 0.1M up to 16M. In the absence of sulfuric acid, the preferred concentration of nitric acid is at least 5M and possibly up to 16M to commence the conversion. As explained with respect to the proposed reaction mechanism, the minimum acid concentration of about 5M is required in order to drive the production of the $NO^+$ ion. Otherwise, the reaction will not proceed rapidly. The reaction proceeds at low concentrations of nitric acid in the presence of at least 5M sulfuric acid which is a good indication that the nitric acid is acting as a catalyst in the overall reaction, and that the losses of nitric acid are primarily due to gaseous nitric acid carried out with the purified gas stream or with removed concentrated sulfuric acid.

Various experimental runs which were commenced in the absence of $H_2SO_4$ proceeded to convert $SO_2$ into $H_2SO_4$. It would appear that at a sufficiently high concentration of $HNO_3$, in the presence of $O_2$, the $HNO_3$ still catalyzes the conversion. As more of the incoming $SO_2$ is converted to $H_2SO_4$, eventually the process reaches normal operating conditions where the $HNO_3$ and $H_2SO_4$ concentrations are in the desired range.

Also, when the gas stream includes an incoming $H_2S$ component, the oxygen is of course used in the combustion or oxidation of $H_2S$ to $SO_2$. Overall, that reaction is believed to proceed in accordance with:

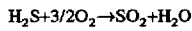

$$H_2S + 3/2 O_2 \rightarrow SO_2 + H_2O$$

Hence, the process of this invention can be conducted at very economical temperatures up to 150° C. and at the aforementioned very low pressures.

Although the concentrations of sulfuric acid and nitric acid are relatively high and will require special equipment, in terms of manufacturing facility, it is understood that several other existing processes deal with these concentrations of sulfuric and nitric acid. Preferably, the concentration of sulfuric acid used in the process is from 12 to 16M and correspondingly the nitric acid concentration is preferably in the range of 0.1M to 5M, when operating in the temperature range of 30° C. to 100° C. Although when conducting the conversion in a tower, it is preferred to have a temperature at the bottom in the range of 130° C. to 150° C. so as to denitrify the concentrate. Considering the conversion results that have been achieved at the reduced temperatures with a minimum concentration of nitric acid of less than 3M and perhaps as low as 0.1M when in the presence of sulfuric acid, the physical requirements for the reactor physical plant systems can be of less expensive materials.

Another advantage in carrying out the reaction in the liquid phase, is that any inerts produced in the combustion of $H_2S$, or any other forms of inerts that occur in the source of the $SO_2$ stream, simply pass through the liquid phase, without interfering with the oxidation and conversion of $SO_2$ to sulfuric acid. For example, in the combustion of mercaptans, the produced carbon dioxide and carbon monoxide pass through this system without interfering with the reaction other than the carbon monoxide, would be oxidised to carbon dioxide. Furthermore, any gaseous amines produced would also not interfere with the reaction and would react with the acids to produce as a final product $N_2$ and $CO_2$ which would pass through the system and continue with the stream purified of $H_2S$ and other $SO_x$ components. Of course, any sulfur containing amines would additionally be converted to $SO_2$ which is converted in accordance with the subject process.

It is also understood that with the contact process for making sulfuric acid, there are significant limitations in respect of the thermodynamics of the prior process and the kinetics of that reaction. In accordance with this invention, the reaction in the liquid phase over a series of mass transfer interface plates, does not appear to have any limitations, kinetically or thermodynamically as evidenced by the fairly broad range at which the acid concentrations may exist. The oxygen concentration in the incoming source thereof, is sufficient to react fully with the $SO_2$ stream. The temperatures and pressures at which the process is effective vary widely. The prior art contact process and lead chamber process have much narrower limitations on such ranges.

Although it is understood that the process of this invention may be carried out in a variety of different types of chemical processing physical plant, FIG. 1 is a schematic of one suggested physical plant in which the process may be carried out. The physical plant 10, comprises an incinerator 12, a sulfuric acid concentrator 14, a mass transfer column 16, heat exchanger 18 and pumps 20 and 22. An incoming gas stream to be treated, is introduced in the direction of arrow 24 to conduit 26, which has an offset 'T' section 28, which leads into the incinerator 12 through the bottom wall portion 30. If the incoming gas stream 24 contains $H_2S$, it is desirable to combust the $H_2S$ in the incinerator 12. It is understood that the incoming gas stream may have sufficient oxygen to support combustion. However, if it does not, air is introduced to conduit 26 in the direction of arrow 32. The incoming stream 32 may also be oxygen fortified air or pure oxygen, depending upon the amount of oxygen required to ensure combustion of $H_2S$ in forming the desired $SO_2$ gas stream. Combustion is supported within the incinerator 12 in the lower region 34, where combustion continues in the direction of arrow 36 to produce an exhaust stream comprising $SO_2$, which is removed through the incinerator via conduit 38 in the direction of arrow 40. In accordance with a preferred aspect of the invention, the incinerator 12, includes within its outer wall portion 42, the sulfuric acid concentrator 14. The sulfuric acid concentrator 14, comprises a vessel 44, with interior wall 46. An inlet 48 to the bottom 50 of the vessel introduces a portion of the liquid phase withdrawn from the tower 16 through line 52 in the direction of arrow 54. The liquid phase is withdrawn from the bottom portion of the tower 16 in the manner to be discussed. The liquid phase 56, within the concentrator 14, is heated by the heat of combustion of the incoming gas stream, to heat the liquid phase to a temperature where water and any remaining nitric acid and other nitrogen components are boiled off of the liquid phase 58, with a gas stream exiting exhaust conduit 60 in the direction of arrow 62. By removing water from the liquid phase 56, it is understood that the sulfuric acid, which does not boil off in the liquid phase, instead continues to be concentrated within the concentrator vessel 44, until it achieves the desired concentration of perhaps 90% or greater, and preferably 98% or greater. The concentrated sulfuric acid from the concentrator 14 is removed via conduit 64, which travels in the direction of arrow 66 and is introduced to the suction side of pump 22. Pump 22, delivers the concentrated sulfuric acid through heat exchanger 18, where a coolant is introduced at 68 and is removed at 70, to reduce the temperature of the concentrated sulfuric acid to less than 150° C. The concentrated sulfuric acid then leaves the heat exchanger 18 through conduit 72 in the direction of arrow 74. A portion of that concentrated sulfuric acid is diverted through 'T' section with conduit 76, for introducing it back into the column 16, in the direction of arrow 78. The remainder of the concentrated sulfuric acid which is put to whatever purpose or storage, is removed in conduit 80 in the direction of arrow 82.

In advance of the mass transfer column 16, the stream of $SO_2$ source to be treated, moves through conduit 38, in the direction of arrow 40 into the lower portion 84 of the tower 16 through inlet 86. The incoming stream of sulfur dioxide is mixed at juncture 88 with a source of oxygen introduced in the direction of arrow 90 into conduit 92, and is compressed to the desired low pressure through pump 20 and directed in the direction of arrow 94 to the juncture 88 through conduit 96. Sufficient oxygen is supplied in the incoming stream of $SO_2$ to ensure conversion of $SO_2$ into $H_2SO_4$ by oxidising the nitrosyl group to regenerate nitric acid. The gas stream at a sufficiently low pressure, bubbles upwardly through the mass transfer plates 98 in the direction of arrows 100. The liquid phase which travels downwardly of the mass transfer plates is shown schematically at 102 on each plate or tray 98. In the usual manner with a mass transfer column, tray 98 is perforated to include openings 104 which permit the gases to bubble upwardly through the downwardly flowing or countercurrently flowing liquid phase 102. Suitable downcomers 106 are provided on each tray, to permit liquid to flow from each tray to the next tray. Furthermore, the height of the downcomers determines the height of liquid above each tray.

It is understood that one or more downcomers may be provided on each tray and also that the size of the perforations 104 on each tray are selected to support the necessary amount of liquid above the tray, without passing through the openings and at the same time, allow sufficient time for the gases bubbling through the liquid phase 102 to react and achieve conversion of the developed $SO_3$ from $SO_2$ to $H_2SO_4$. Although the tower 16 is exemplary of any type of mass transfer column that might be used, this system is preferred from the stand point of materials of construction and cost of manufacture and erection. It is understood that other types of mass transfer systems may be used such as packed columns with packing immersed in liquid, combination of packing with trays and the like. The gases as they flow upwardly through the column 16 are gathered and removed through outlet 108 in conduit 110 in the direction of arrow 112. It is desirable to recycle a portion of the treated gases so that conduit 114, as directed to the suction side of pump 20, withdraws a portion of the treated gases for recycle in direction of arrow 116. Such recycled gas and possibly some make-up water in the form of steam (as required to control acid concentration), is combined with the incoming source of oxygen through conduit 92 before being compressed in pump 20 to the operating pressure which as previously mentioned is normally in the range of ¼ to ½ an atmosphere.

The downcoming liquid is gathered at the base of tower 16, preferably in a tower well 118. Liquid is extracted from the well 118 through liquid outlet 120, which is delivered in the direction of arrow 54 to the conduit 52 for concentration in the concentrator 14.

Sufficient make up nitric acid is introduced to one of the mid level trays in the column 16, representatively in the direction of arrow 122. In addition, the reaction on the lower trays proceeds at a higher rate because of the greatest concentration of $SO_2$, so that it may be necessary to remove heat from the lower trays. Cooling is designated on the lower trays by the representative inlet and outlet arrows 124 and 126.

In accordance with standard chemical engineering practice, a suitable mass balance is applied to the system, where liquid withdrawn from column 16 is equivalent to the rate of introduction of liquid to the column through conduit 76, once the system has reached steady state operation. Make up nitric acid to column 16 may be determined based on the amount of nitric acid lost through stack 60 of concentrator 14 in the direction of arrow 62. It is appreciated that a suitable heat exchanger may be provided in line 60 to condense the off gases and return in liquid phase captured nitric acid that has been boiled off in the concentrator 14. That captured nitric acid may also be reintroduced to the column 16 through line 122 for recycle purposes. It may be necessary to also treat the condensed liquid to convert any captured $NO_x$ to nitric acid before reintroduction to the column 16 through line 122 with the necessary make-up water as needed to convert $SO_3$ to $H_2SO_4$ and maintain proper concentrations of acid in the liquid phase. Once the system reaches a steady state, it is understood that the amount of sulfuric acid removed in line 80 is equal to that generated by the conversion of the incoming stream of $SO_2$ to sulfuric acid. On an ongoing basis, waste streams, containing sulfur components can be converted to sulfuric acid at a sufficiently high concentration that it is ready for reuse perhaps in the system that has in the first instance generated the source of sulfur such as the aforementioned mining, metal and paper production processes.

The proposed reaction scheme has been verified by several experimental runs. A source of $SO_2$ combined with oxygen has been bubbled through an aqueous phase containing the desired concentrations of sulfuric and nitric acid. We have found that the exhaust gases from the system are free of $SO_2$ and are constituted primarily by oxygen until the catalyst is fully formed in the liquid phase at which point in the reaction, available oxygen was used in the conversion of $SO_2$ to $H_2SO_4$. Also we have found that the concentration of sulfuric acid in the composition gradually increases during the bubbling process. It is also theorised that $NO^+$ produced during the catalytic conversion of $SO_2$ in the presence of oxygen is converted back to nitric acid, so that the desired $HNO_3$ concentration in the aqueous phase is maintained. The several runs that have been carried out confirm the homogeneous catalytic nature of the regeneration of the $HNO_3$ in the reaction.

Experimental runs were conducted where the reaction is commenced in the presence of nitric acid and in the absence of sulfuric acid. Oxygen was introduced to the liquid phase along with sulfur dioxide where in the first instance a concentration of nitric acid that is in excess of 5M and preferably in the range of 7M was used. The nitric acid was still able to catalyze the conversion of $SO_2$ into $H_2SO_4$. In continuing the process, the concentration of $H_2SO_4$ in the liquid phase continued to build until it reached a level which is in the desired range of 10M to 16M. During the build up of sulfuric acid, it was observed that the concentration of nitric acid reduced over time until it reached a lower level of about 2M. Hence during the initial phases, until the desired concentration of sulfuric acid was achieved, the nitric acid in the liquid phase is in essence diluted by the production of the sulfuric acid, however, nitric acid is not used up in the process. Additional experimental runs were carried out at reduced concentrations of nitric acid in the range of 0.1M to 1M and in the initial presence of sulfuric acid of at least 5M. At these lower concentrations of nitric acid and at either room or elevated temperature, conversion of $SO_2$ to $H_2SO_4$ was achieved. In such experimental runs, the concentration of sulfuric acid, at commencement, may be below the desired minimum of 10M. However, the reaction proceeds and preferably the concentration of sulfuric acid is at least 5M when the nitric acid concentration is at a lower level, at the commencement so that the reaction proceeds quickly and the build up of sulfuric acid to the desired level occurs.

The additional experimental runs demonstrated that as low as 0.1M $HNO_3$ was all that was required at a temperature of about 30° C. to 35° C. to effect conversion of the $SO_2$ to $H_2SO_4$ in the presence of water and sufficient sulfuric acid. Such initiating reactions have been found to proceed rapidly at temperatures of about 45° C. to 50° C. and well below the 3M concentration of $HNO_3$. As these experimental runs proceeded, of course the concentration of sulfuric acid began to build to levels that would be normally expected. These additional experimental results indicate that at the top of the mass transfer tower, the downwardly flowing liquid may only require nitric acid and that the temperature need only be in the range of 30° C. to 50° C. where the concentration of nitric acid could be as low as 5M. Below the top few plates of the tower, the temperature would gradually increase from approximately 45° C. to about 90° C. with the temperature of the plates in the bottom portion of the tower approaching 130° C. to 150° C. The experimental runs indicate that the complete conversion can take place in one tower with perhaps no more that 15 plates or the equivalent thereof. In accordance with usual chemical engineering practices, this could be achieved by varying the depth of liquid on the trays, varying the size of the downcomers, varying the heat loss to surroundings and transferring heat with heat exchangers to provide a compact tower that would give the desired 80% plus concentration of $H_2SO_4$. With this range of temperatures, it would also be possible to provide a concentration of sulfuric acid at the bottom of the tower that is devoid of $NO_x$ because of this warm zone at the base of the tower should leave the $H_2SO_4$ solution free of any nitrogen compounds. In view of the experimental runs indicating that the conversion can be initiated in the absence of sulfuric acid, it is conceivable that the tower conditions only require the presence of the nitric acid in the downcoming liquid at the top of the tower and no sulfuric acid, where the sulfuric acid concentration, due to conversion, increases from essentially nothing at the top of the tower to the desired 10M to 16M at the bottom of the tower.

Experimental runs were also undertaken to demonstrate that the conversion of $SO_2$ to sulfuric acid is a liquid catalytic reaction. A conversion solution was made up containing both sulfuric acid and nitric acid, where the concentration of nitric acid was about 0.5M. The conversion solution was initiated at 35° C. as a combined gas of sulfur dioxide and oxygen was bubbled through the conversion solution. The combined gases were bubbled through the conversion solution for upto 2.5 days where even at the end of 2.5 days, conversion of $SO_2$ to sulfuric acid continued without any appreciable change in the concentration of nitric acid in the solution.

Experimental runs were also conducted to demonstrate that there is indeed a fast reaction in solution. The conversion solution contained approximately 7M sulfuric acid and 3M nitric acid. To establish the rate of the reaction, the standard bubble disappearing experiments were conducted. The combined gas of sulfur dioxide and oxygen were bubbled into the solution where the bubbles were initiated at diameters in the range of 3 to 4 mm. These bubbles shrank immediately in the column of conversion solution which is about 80 cms high to a diameter of about 0.25 mm. The rate of bubble rise through this column of conversion solution was 2 to 3 seconds and in view of the bubble size reduction all within 10 cm rise, a conversion of greater than 90% and as high as 99% was realized. If the reaction were diffusion controlled as is the case in carrying out the reaction in the prior art gaseous phase with thin film liquid on solid surfaces, the bubble should have risen approximately 1000 times as far before shrinking to the extent realized in the experimental runs of this invention. In view of this rapid conversion, the use of a compact tower, preferably of about 15 plates in height, will provide for the necessary conversion to produce the desired level of sulfuric acid at the base of the conversion tower which provides for the necessary mass transfer in the chemical conversion. Furthermore, in view of the reaction being carried out in the liquid phase, very little space is required in the tower to accommodate the gases bubbling up through the tower.

Although preferred embodiments of the invention are described herein in detail, it will be understood by those skilled in the art that variations may be made thereto without departing from the spirit of the invention or the scope of the appended claims.

I claim:

1. A process for producing in a continuous liquid phase sulfuric acid from a source of sulfur dioxide, said process comprising:
   i) bubbling into said continuous liquid phase a gaseous source of sulfur dioxide and a gaseous source of oxygen;
   ii) converting in the continuous liquid phase said gaseous source of sulfur dioxide to sulfuric acid, said continuous liquid phase comprising:
      nitric acid and sulfuric acid at a sufficient concentration to develop nitrate ions in the continuous liquid phase which oxidize in the continuous liquid phase sulfur dioxide at sulfur dioxide bubble surface, to sulfuric acid and thereby produce nitrosyl ions where the combined concentration of nitric acid and sulfuric acid ranges from 5M to 16M with the proviso that the minimum concentration of nitric acid is 0.1M;
   iii) said gaseous source of oxygen being bubbled into said continuous liquid phase in a stoichiometric excess to support the catalytic conversion in the continuous liquid phase of $SO_2$ into $H_2SO_4$ which includes regenerating in the continuous liquid phase nitrate ions by oxidizing in the liquid phase the nitrosyl ions at oxygen bubble surface to produce in the liquid phase the necessary nitrate ions to continue oxidation of said sulfur dioxide; and
   iv) maintaining said liquid phase at a temperature in the range of 20° C. to 150° C.

2. A process of claim 1 wherein said source of $SO_2$ is from burning a source of sulfur.

3. A process of claim 2 wherein said concentration of sulfuric acid is at least 10M and said concentration of nitric acid is 0.5 to 5M.

4. A process of claim 2, wherein said source of oxygen is compressed and mixed with said source of $SO_2$ before introduction to said aqueous phase.

5. A process of claim 1 wherein said temperature of said conversion solution ranges from 30° C. to 50° C. in the presence of at least 5M sulfuric acid and less than 3M nitric acid.

6. A process of claim 1 wherein said source of $SO_2$ is from burning a component selected from the group consisting of $H_2S$, liquid sulfur and solid sulfur.

7. A process of claim 6, wherein heat of combustion during burning of said selected $H_2S$ liquid or solid sulfur, is directed to a boiler for evaporating a portion of said liquid phase to concentrate sulfuric acid, said portion of said liquid phase being removed, concentrated in said boiler and partially recycled to said liquid phase and remainder diverted as a source of concentrated sulfuric acid.

8. A process of claim 7, wherein said sulfuric acid concentration is greater than 98% by weight in said diverted source of concentrated sulfuric acid.

9. A process of claim 7, wherein gases from evaporation of said portion of said liquid phase, are condensed to recover any $NO_x$, $HNO_3$ and combinations thereof.

10. A process of claim 1 wherein said source of $SO_2$ is from burning a component selected from the group consisting of mercaptans, polysulfides, sulfur containing amines, solid sulfide and solid polysulfides.

11. A process of claim 1 wherein said source of $SO_2$ is in the gaseous phase, said gaseous phase being bubbled through said liquid phase as provided in a mass transfer tower, said gaseous phase containing $SO_2$ being introduced to a bottom portion of said tower and said liquid phase being introduced to a top portion of said tower, said liquid phase at said bottom portion having a concentration of sulfuric acid of about 10M to 16M.

12. A process of claim 11 wherein said tower is packed with a mass transfer packing and said packing is immersed in said liquid phase.

13. A process of claim 12 wherein said packing is supported on spaced apart liquid re-distribution plates or mass transfer plates.

14. A process of claim 11 wherein said tower comprises a plurality of mass transfer trays on which each of said trays said liquid phase is retained.

15. A process of claim 12 wherein one or more of said trays are cooled to maintain an aqueous phase temperature of less than 150° C.

16. A process of claim 15 wherein said aqueous phase is maintained at a temperature between 20° C. to 150° C. from top to bottom of said tower.

17. A process of claim 11, wherein said gaseous phase exits said tower at said top portion as a gas stream in which $SO_2$ is substantially completely removed by said liquid phase conversion of $SO_2$ into sulfuric acid.

18. A process of claim 17, wherein oxygen is compressed in combination with a recycled portion of said gas stream from said tower and mixed with said source of $SO_2$ before introduction to said liquid phase.

19. A process of claim 12, wherein make-up nitric acid is added to a mid-level tray in said tower.

20. A process of claim 19, wherein concentration of sulfuric acid in said aqueous phase at the mid-level tray is approximately 14M, concentration of said nitric acid is approximately 3M or less and liquid phase temperature is less than 150° C.

21. A process of claim 1 wherein said liquid phase reaction is carried out in a stirred continuous reactor, said concentration of nitric acid being about 3M or less and a concentration of sulfuric acid of at least 5M, said liquid phase temperature being maintained at a temperature less than 50° C.

22. A process of claim 1 wherein said gaseous $SO_2$ and gaseous $O_2$ are bubbled into the liquid phase either in separate streams or in a single combined stream.

* * * * *

UNITED STATES PATENT AND TRADEMARK OFFICE
CERTIFICATE OF CORRECTION

PATENT NO. : 5,788,949
DATED : August 4, 1998
INVENTOR(S) : O'Brien

It is certified that error appears in the above-identified patent and that said Letters Patent is hereby corrected as shown below:

On the title page: Item [56]

In the References Cited, OTHER PUBLICATIONS, line 2, "265-266" should be --255-256--.

Column 14, line 4, "claim 12" should be --claim 14--; line 10, "claim 11" should be --claim 14--; line 18, "claim 12" should be --claim 14--.

Signed and Sealed this

Tenth Day of November 1998

Attest:

BRUCE LEHMAN

Attesting Officer         Commissioner of Patents and Trademarks